United States Patent
Konishi et al.

(10) Patent No.: US 10,688,878 B2
(45) Date of Patent: Jun. 23, 2020

(54) VARIABLE-GAUGE-TRAIN CONTROL DEVICE

(71) Applicants: MITSUBISHI ELECTRIC CORPORATION, Chiyoda-Ku, Tokyo (JP); KYUSHU RAILWAY COMPANY, Hakata-Ku, Fukuoka (JP)

(72) Inventors: Kazuki Konishi, Tokyo (JP); Hidetoshi Kitanaka, Tokyo (JP); Tsuyoshi Morimitsu, Fukuoka (JP); Yuichi Mimura, Fukuoka (JP); Soichiro Watanabe, Fukuoka (JP)

(73) Assignees: MITSUBISHI ELECTRIC CORPORATION, Chiyoda-Ku, Tokyo (JP); KYUSHU RAILWAY COMPANY, Hakata-Ku, Fukuoka (JP)

( * ) Notice: Subject to any disclaimer, the term of this patent is extended or adjusted under 35 U.S.C. 154(b) by 175 days.

(21) Appl. No.: 16/028,922

(22) Filed: Jul. 6, 2018

(65) Prior Publication Data
US 2018/0312079 A1    Nov. 1, 2018

Related U.S. Application Data

(63) Continuation of application No. 15/520,274, filed as application No. PCT/JP2014/078076 on Oct. 22, 2014, now abandoned.

(51) Int. Cl.
*B60L 15/20* (2006.01)
*B60G 21/05* (2006.01)
(Continued)

(52) U.S. Cl.
CPC .......... *B60L 15/2036* (2013.01); *B60L 15/20* (2013.01); *B60W 10/08* (2013.01); *F02D 41/045* (2013.01);
(Continued)

(58) Field of Classification Search
CPC ...... B60L 15/2036; B60L 3/102; B60L 15/20; B60L 9/16; B60G 3/202; B61F 7/00
See application file for complete search history.

(56) References Cited

U.S. PATENT DOCUMENTS

| | | | |
|---|---|---|---|
| 4,327,313 A * | 4/1982 | Tsuboi | B60L 3/102 318/52 |
| 2007/0290473 A1 * | 12/2007 | Buma | B60G 3/202 280/124.106 |

FOREIGN PATENT DOCUMENTS

| | | |
|---|---|---|
| JP | 55-117403 A | 9/1980 |
| JP | 06-217407 A | 8/1994 |

(Continued)

OTHER PUBLICATIONS

International Search Report (PCT/ISA/210) dated Jan. 6, 2015, by the Japanese Patent Office as the International Searching Authority for International Application No. PCT/JP2014/078076.

(Continued)

*Primary Examiner* — Yuri Kan
(74) *Attorney, Agent, or Firm* — Buchanan Ingersoll & Rooney PC

(57) ABSTRACT

A variable gauge train control device comprises an inverter, a location detector, and a torque calculator. The inverter collectively controls torques of main electric motors. The location detector detects an entry into a gauge changeover section. The torque calculator, upon detection by the location detector of the entry into the gauge changeover section, suspends idling control that otherwise restricts the torques of the main electric motors and calculates a first torque pattern for making the inverter operate in accordance with the torques of the main electric motors.

10 Claims, 7 Drawing Sheets

(51) Int. Cl.
*B60L 9/16* (2006.01)
*B60W 10/08* (2006.01)
*F02D 41/04* (2006.01)

(52) U.S. Cl.
CPC ... *B60L 2240/461* (2013.01); *B60L 2240/465* (2013.01); *B60W 2510/082* (2013.01); *F02D 2250/18* (2013.01); *F02D 2250/28* (2013.01); *Y02T 10/645* (2013.01); *Y02T 10/646* (2013.01); *Y02T 10/7241* (2013.01); *Y02T 10/7275* (2013.01)

(56) References Cited

FOREIGN PATENT DOCUMENTS

| JP | 06217407 A | * | 8/1994 | ............... B60L 9/16 |
|----|------------|---|--------|---------------------------|
| JP | 2002-233005 A | | 8/2002 | |
| JP | 2002233005 A | * | 8/2002 | ............. B60L 15/20 |
| JP | 2005-204462 A | | 7/2005 | |
| WO | 2010024502 A1 | | 3/2010 | |
| WO | WO-2010024502 A1 | * | 3/2010 | ............... B61F 7/00 |

OTHER PUBLICATIONS

Written Opinion (PCT/ISA/237) dated Jan. 6, 2015, by the Japanese Patent Office as the International Searching Authority for International Application No. PCT/JP2014/078076.

\* cited by examiner

VARIABLE-GAUGE-TRAIN CONTROL DEVICE

CROSS-REFERENCE TO RELATED APPLICATIONS

This application is a continuation application of U.S. patent application Ser. No. 15/520,274, filed Apr. 19, 2017, which is a national stage filing under § 371 of International Application No. PCT/JP2014/078076, filed Oct. 22, 2014, the entire contents of each of which are hereby incorporated by reference in their entireties.

TECHNICAL FIELD

The present disclosure relates to a variable gauge train control device.

BACKGROUND ART

Variable gauge trains change the distance between wheels provided to their cars as the cars pass over a gauge changeover device connecting rails different in gauge. The gauge changeover device supports the car body so that the car body does not weigh on the wheels and in that state, moves the wheels in the axle direction along the guide rails so as to change the distance between the wheels. Therefore, the wheels run idle while the distance between the wheels is changed.

When the wheels run idle, the control device of electric trains generally performs idling control to restrict the torques of the main electric motors for stopping the idling state of the wheels.

It is assumed that a collective control system controlling main electric motors with a single inverter is employed with a variable gauge train. As the wheels undergoing change in the distance run idle, the idling control is performed, whereby the torques of all main electric motors controlled by the inverter shared with the main electric motors driving those wheels are restricted.

For example, in the case of a collective control system in which a single inverter controls all main electric motors mounted on a single train car, while the distance between some of the wheels is changed, the torques of all main electric motors of the train car to which those wheels are provided are restricted. Therefore, almost no driving force is obtained from the train car of which some wheels are undergoing change in the distance. Consequently, the driving force of the entire train may significantly drop while the distance between the wheels is changed.

Patent Literature 1 discloses a variable gauge motor train car control device employing an individual control system for properly controlling the driving force of the wheels during the gauge changeover operation. The individual control system is a system controlling a single main electric motor with a single inverter.

CITATION LIST

Patent Literature

Patent Literature 1: Unexamined Japanese Patent Application Kokai Publication No. 2002-233005.

SUMMARY OF INVENTION

Technical Problem

However, the collective control system, compared to the individual system, requires fewer numbers of inverters and controllers performing the control. Therefore, the collective control system is desirable for reducing a variable gauge train control device in size, weight, and cost.

The present disclosure is made with the view of the aforementioned circumstances and an objective of the disclosure is to provide a variable gauge train control device that can suppress a drop in the driving force of the entire train even in a collective control system.

Solution to Problem

In order to achieve the above objective, a variable gauge train control device according to the present disclosure comprises an inverter to collectively control torques of main electric motors, a location detector to detect entry into a gauge changeover section, an idling detector to detect idling of wheels and output idling detection information, a torque calculator to calculate a first torque pattern for making the inverter operate and, when the idling detection information indicating idling of wheels is input from the idling detector, calculate a second torque pattern for making the inverter operate with more restricted torques of the main electric motors than the first torque pattern, and an idling control switcher to, upon detection by the location detector of the entry into the gauge changeover section, block the idling detection information output from the idling detector to the torque calculator.

Advantageous Effects of Invention

According to the present disclosure, when entry into a gauge changeover section is detected, idling control that otherwise restricts the torques of main electric motors is suspended, and a first torque pattern is calculated. As a result, even if the wheels run idle in the gauge changeover section, the torques of the main electric motors will not be restricted by the idling control. Therefore, a drop in the driving force of the entire train can be suppressed even in a collective control system.

DESCRIPTION OF EMBODIMENTS

Embodiments of the present disclosure are described with reference to the drawings. The same components will be referred to by the same reference numbers throughout the figures.

Embodiment 1

Figure 1:
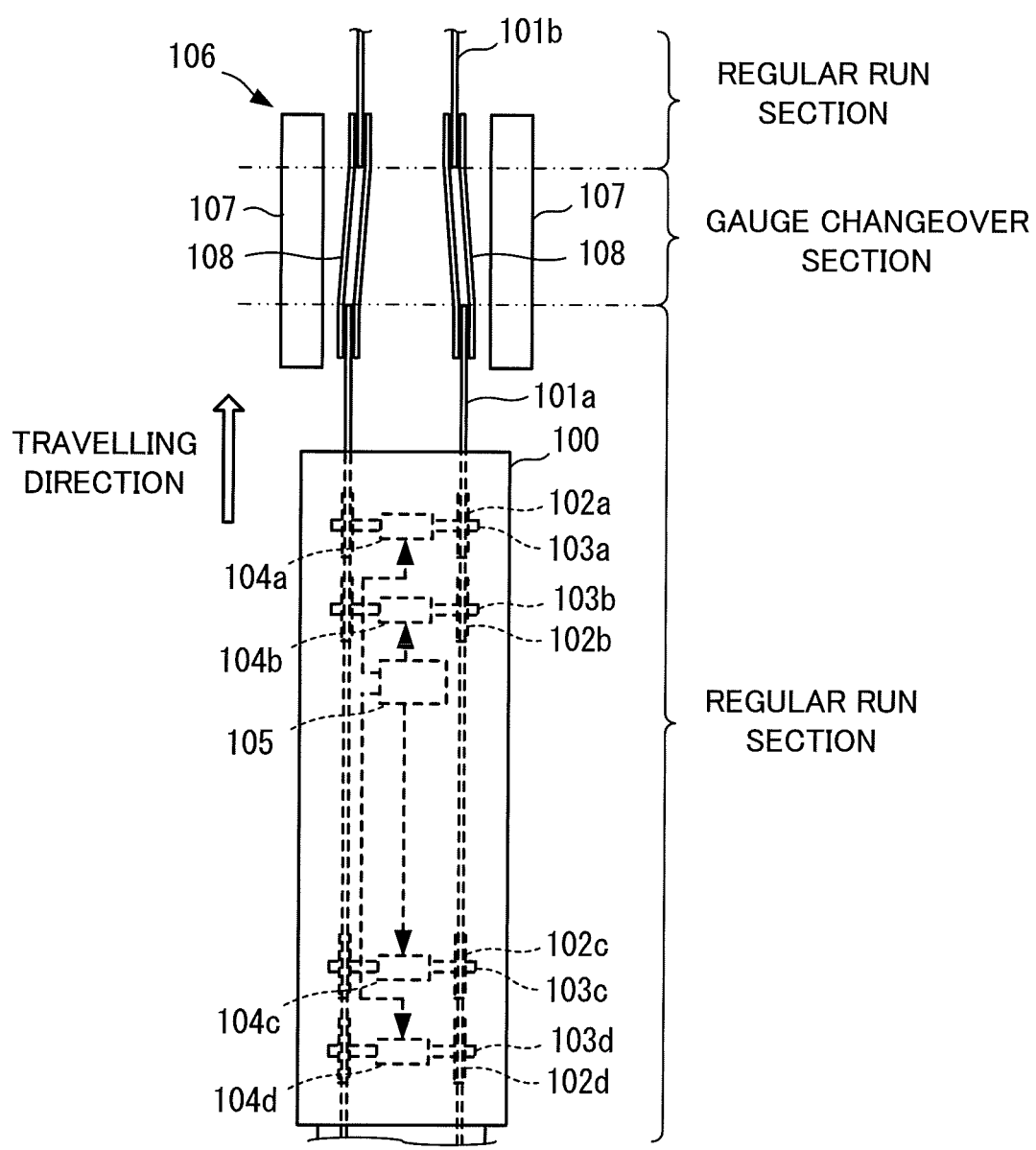
FIG. 1 is a diagram illustrating a configuration of a variable gauge train according to Embodiment 1 of the present disclosure.

A variable gauge train 100 according to Embodiment 1 of the present disclosure is, as illustrated in FIG. 1, an electric car that runs directly over a railroad 101a and a railroad 101b, which are different in gauge. The variable gauge train 100 comprises, as illustrated in the same figure, four pairs of wheels 102a to 102d wherein the wheels of each pair of face each other in the widthwise direction of a car body, four axles 103a to 103d serving as the center of rotation of each pair of the wheels 102a to 102d, four main electric motors 104a to 104d provided on the four axles 103a to 103d, respectively, and a control device 105 for controlling torques of the main electric motors 104a to 104d. Here, the torques of the four main electric motors 104a to 104d mean the torques the main electric motors 104a to 104d individually output.

Moreover, the variable gauge train 100 comprises a mechanism (not illustrated) for changing the distance in the widthwise direction between each pair of the wheels 102a to 102d while passing over a gauge changeover device 106 as illustrated in the same figure.

Here, the gauge changeover device 106 is provided in a gauge changeover section situated between a regular run section of the railroad 101a and a regular run section of the railroad 101b. In detail, the gauge changeover device 106 comprises, as illustrated in the same figure, car body supports 107 supporting the car body passing through the gauge changeover section from underneath and guide rails 108 guiding the wheels 102a to 102d while passing through the gauge changeover section.

The car body supports 107 support the car body from underneath so that the car body does not weigh on the wheels 102a to 102d while passing through the gauge changeover section. As a result, the wheels 102a to 102d make no contact with the rails of the railroads 101a and 101b while passing through the gauge changeover section, and nearly float in the air. For example, the car body supports 107 are long enough to float two pairs of wheels 102a and 102b (or wheels 102c and 102d) in the air in the lengthwise direction of the variable gauge train 100.

The guide rails 108 abut against the wheels 102a to 102d while passing through the gauge changeover section and move the wheels 102a to 102d in the widthwise direction. The wheels 102a to 102d while passing through the gauge changeover section move along the guide rails 108 as the variable gauge train 100 travels. Consequently, the wheels 102a to 102d move in the widthwise direction while passing through the gauge changeover section. Therefore, as the variable gauge train 100 passes over the gauge changeover device 106, the width between the wheels 102a to 102d is increased or decreased depending on the travelling direction of the variable gauge train 100.

For example, it is assumed that the variable gauge train 100 travels in the traveling direction indicated by the arrow in the same figure and enters the gauge changeover device 106 from the regular run section of the railroad 101a. Then, it is assumed that the variable gauge train 100 is supported by the car body supports 107 and consequently, the car body does not weigh on the wheels 102a and 102b while passing through the gauge changeover section. In such a case, the wheels 102a and 102b abut against the guide rails 108, thereby causing the width between the wheels 102a and the width between the wheels 102b to gradually decrease as the variable gauge train 100 travels. Similarly, the width between the wheels 102c and the width between the wheels 102d is gradually decreased as the variable gauge train 100 travels. Therefore, as the variable gauge train 100 travels in the travelling direction indicated by the arrow in the same figure, the width between the wheels 102a to 102d can be decreased. When the variable gauge train 100 travels in the direction opposite to the arrow in the same figure, the width between the wheels 102a to 102d is increased.

Figure 2:
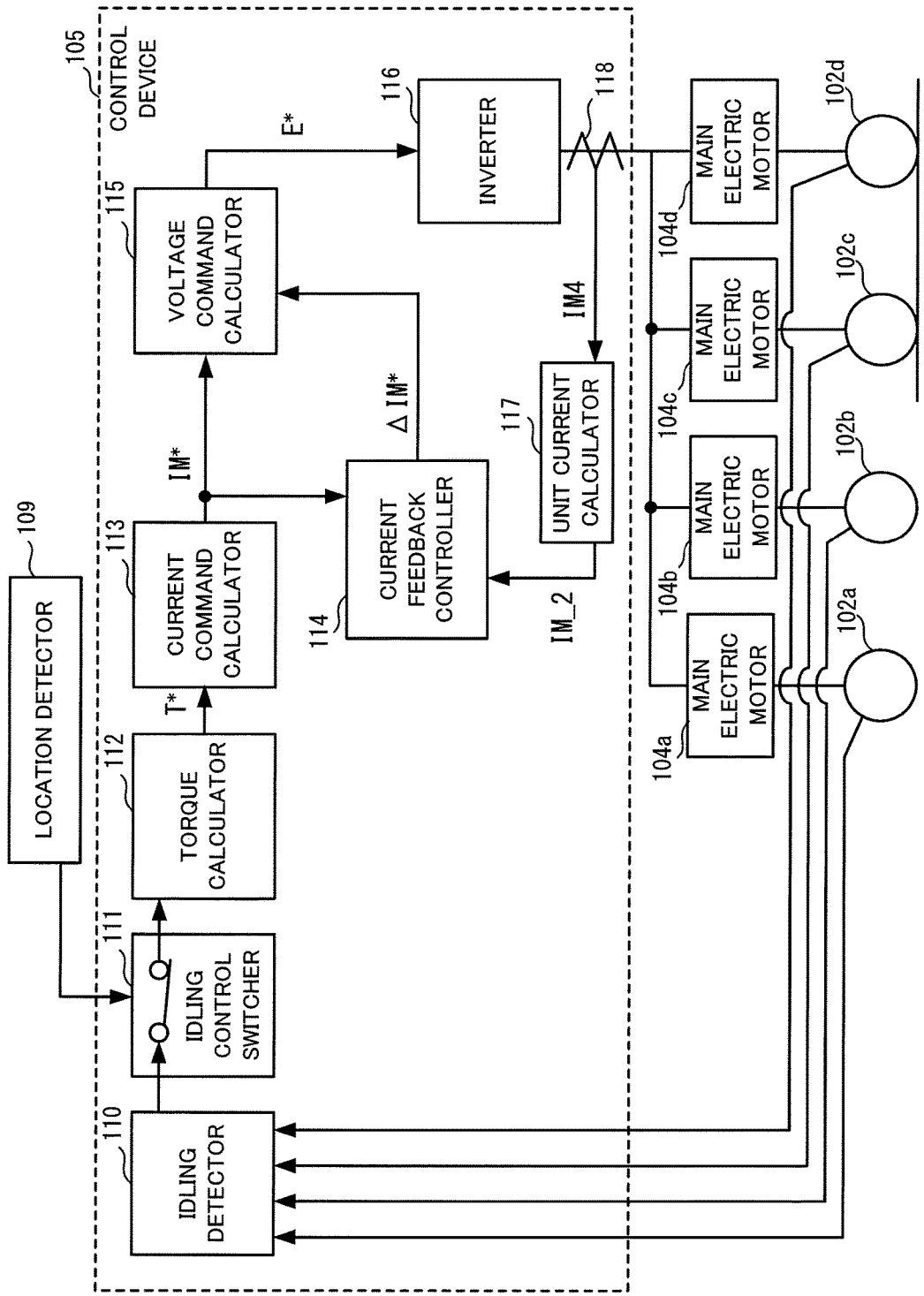
FIG. 2 is a diagram illustrating a configuration of a control device according to Embodiment 1.

The control device 105 according to this embodiment is a control device mounted on the variable gauge train 100 and utilizes a collective control system in which a single inverter 116 controls the main electric motors 104a to 104d as illustrated in FIG. 2. Here, with the control device 105 of the collective control system, any number of two or more of main electric motors 104a to 104d may be controlled by the single inverter 116.

The control device 105 comprises, as illustrated in the same figure, a location detector 109 detecting the location of the variable gauge train 100, an idling detector 110 detecting idling of each of the wheels 102a to 102d, an idling control switcher 111 for switching between suspension and suspension release of idling control (described in detail below) based on the detection result of the idling detector 110, a torque calculator 112 calculating a torque pattern T for making the inverter 116 operate in accordance with the torques of the main electric motors 104a to 104d, a current command calculator 113 calculating a current IM_1 to flow through each one of the main electric motors 104a to 104d, a current feedback controller 114 calculating a correction amount ΔIM for current feedback control (described in detail below) based on the current IM_1 and a current IM_2 actually flowing through each one of the four main electric motors 104a to 104d, a voltage command calculator 115 calculating a voltage E for the inverter 116 to output based on the current IM_1 and the correction amount ΔIM, the inverter 116 collectively controlling the torques of the main electric motors 104a to 104d based on the voltage E, and a unit current calculator 117 calculating a current IM_2 based on the total value IM4 of current flowing from the inverter 116 to the four main electric motors 104a to 104d.

The location detector 109 detects whether the variable gauge train 100 is in the gauge changeover section and outputs location information indicating the detection result.

In detail, the location detector 109 acquires information acquired from an automatic train stop (ATS) beacon, a global positioning system (GPS), or the like. The location detector 109 detects entry of the variable gauge train 100 into the gauge changeover section and exit of the variable gauge train 100 from the gauge changeover section based on the acquired information.

When entry of the variable gauge train 100 into the gauge changeover section is detected, the location detector 109 outputs location information indicating entry into the gauge changeover section. When exit of the variable gauge train 100 from the gauge changeover section is detected, the location detector 109 outputs location information indicating exit from the gauge changeover section.

The idling detector 110 detects idling of each of the wheels 102a to 102d and outputs idling detection information indicating the detection result.

In detail, the idling detector 110 acquires, for example, information indicating the rotation numbers FM1 to FM4 per unit time (rotation speed information) as the rotation speeds of the axles 103a to 103d measured by rotation sensors (not illustrated). In such a case, the rotation sensors are correspondingly provided for the axles 103a to 103d and the rotation sensors correspondingly output rotation speed information regarding the axles 103a to 103d. Then, the idling detector 110 calculates the differences in rotation speed based on the acquired information and detects whether each of the wheels 102a to 102d is running idle.

For example, when at least one of the differences in rotation speed between the wheel 102a and the other wheels 102b to 102d is larger than a threshold, the idling detector 110 determines that the wheel 102a is running idle. When all the differences in rotation speed between the wheel 102a and the other wheels 102b to 102d are equal to or smaller than the threshold, the idling detector 110 determines that the wheel 102a is not running idle.

Here, the method of detecting idling of each of the wheels 102a to 102d is not restricted to the above and some other method may be used. For example, in the above case, an average value of the other wheels 102b to 102d may be used instead of the rotation speed of each of the other wheels 102b to 102d. Moreover, idling of each of the wheels 102a to 102d may be detected based on the difference in the rotation numbers FM1 to FM4 of the wheels 102a to 102d per unit of time.

The idling control switcher 111 acquires the location information output from the location detector 109. The idling control switcher 111 switches over as to whether to output idling detection information output from the idling detector 110 to the torque calculator 112 based on the acquired location information.

In detail, when location information indicating entry into the gauge changeover section is acquired, the idling control switcher 111 does not output idling detection information from the idling detector 110 to the torque calculator 112. In other words, in such a case, the idling control switcher 111 blocks idling detection information output from the idling detector 110 to the torque calculator 112 and thus suspends idling control.

When location information indicating exit from the gauge changeover section is acquired, the idling control switcher 111 outputs idling detection information from the idling detector 110 to the torque calculator 112. In other words, in such a case, the idling control switcher 111 releases the blocking of idling detection information output from the idling detector 110 to the torque calculator 112 and thus releases the suspension of idling control.

The torque calculator 112 calculates a torque pattern based on an acceleration/deceleration command from the driving cab, idling detection information, or the like. The torque calculator 112 outputs a torque command T* including a torque pattern T obtained by the calculation.

In detail, the torque calculator 112 calculates a normal torque pattern T when no idling detection information indicating idling of the wheels 102a to 102d is acquired, and calculates an idling control torque pattern T when idling detection information indicating idling of the wheels 102a to 102d is acquired. Here, the normal torque pattern T corresponds to a first torque pattern and the idling control torque pattern T corresponds to a second torque pattern.

The normal torque pattern T is a torque pattern T for each of the main electric motors 104a to 104d to output a torque corresponding to an acceleration/deceleration command from the driving cab or the like.

The normal torque pattern T is calculated while the wheels 102a to 102d are all in the non-idling state and running in the regular run section. In other words, the torque calculator 112 calculates the normal torque pattern T when the idling control switcher 111 is not blocking the idling detection information and no idling detection information indicating idling of the wheels 102a to 102d is output from the idling detector 110. Here, that the wheels 102a to 102d are in the non-idling state means that the wheels 102a to 102d rotate on the rails without slipping.

Moreover, the normal torque pattern T is calculated when the variable gauge train 100 is running in the gauge changeover section. In other words, the torque calculator 112 calculates the normal torque pattern T while the idling control switcher 111 blocks idling detection information indicating idling of the wheels 102a to 102d output from the idling detector 110.

The idling control torque pattern T is a torque pattern T calculated in idling control. The idling control is a control to stop idling of the wheels 102a to 102d. When executed, the idling control makes the idling wheels 102a to 102d regain tractive contact with the rails for non-idling. In detail, the idling control torque pattern T is a torque pattern in which depending on the degree of idling of the wheels 102a to 102d, the normal torque pattern T is restricted to a torque with which the wheels 102a to 102d regain tractive contact with the rails. As just mentioned, as a result of restricting the torques of the main electric motors 104a to 104d in the idling control, the idling wheels 102a to 102d can be made to be in the non-idling state.

The idling control torque pattern T is calculated when at least one of the wheels 102a to 102d running in the regular run section is in the idling state. In other words, the torque calculator 112 calculates the idling control torque pattern T to stop idling of the wheels 102a to 102d when the idling control switcher 111 is not blocking the idling detection information and idling detection information indicating idling of the wheels 102a to 102d output from the idling detector 110 is acquired.

The current command calculator 113 acquires the torque pattern T from the torque calculator 112. The current command calculator 113 calculates a current IM_1 that should flow through each one (unit quantity) of the main electric motors 104a to 104d based on the acquired torque pattern T so as to make the torques of the main electric motors 104a to 104d correspond with the acquired torque pattern T. The current command calculator 113 outputs a current command IM* including the current IM_1 obtained by the calculation.

Here, the unit quantity of the main electric motors 104a to 104d in this embodiment is one; however, the unit quantity is not restricted to one and can be predetermined as appropriate.

The current feedback controller 114 acquires unit current information indicating a current IM_2 from the unit current calculator 117. Moreover, the current feedback controller 114 acquires the current command IM* output from the current command calculator 113.

The current feedback controller 114 calculates a correction amount ΔIM for current feedback control based on the current IM_2 and current IM_1 presented by the acquired unit current information and current command IM*, respectively. The current feedback controller 114 outputs a current feedback control command ΔIM* including the correction amount ΔIM obtained by the calculation.

Here, the current feedback control of a collective control system is a control to make the current that should flow through each one of the collectively controlled main electric motors 104a to 104d and the current actually flowing through each one of the collectively controlled main electric motors 104a to 104d match. The current feedback control according to this embodiment is a control based on the current IM_1 and the current IM_2 and is performed to make the current IM_1 and the current IM_2 match.

The voltage command calculator 115 acquires the current command IM* from the current command calculator 113. The voltage command calculator 115 calculates a pre-current-feedback-control voltage E based on the acquired current command IM*.

Here, the voltage E calculated by the voltage command calculator 115 is a voltage pattern output by the inverter 116 and applied to the main electric motors 104a to 104d in a shared manner.

The voltage command calculator 115 acquires the current feedback control command ΔIM* from the current feedback controller 114.

The voltage command calculator 115 adds the correction amount ΔIM included in the current feedback control command ΔIM* to the pre-current-feedback-control voltage E to make the current flowing through the main electric motors 104a to 104d equal to the target current. As a result, the voltage command calculator 115 calculates a post-current-feedback-control (final) voltage E.

The voltage command calculator 115 outputs a voltage command E* including the post-current-feedback-control voltage E obtained by the calculation. As a result, a voltage E that makes the difference between the current IM_1 and the current IM_2 close to zero can be calculated and output. Here, the pre-current-feedback-control voltage E according to this embodiment corresponds to a first voltage and the post-current-feedback-control voltage E according to this embodiment corresponds to a second voltage.

The inverter 116 acquires the voltage command E* output from the voltage command calculator 115. The inverter 116 outputs a common alternating-current voltage to each of the main electric motors 104a to 104d based on the voltage E presented by the acquired voltage command E*. As a result, the main electric motors 104a to 104d are each driven under the collective control by the inverter 116.

The unit current calculator 117 acquires current information indicating a current IM4 (a current value) flowing through an output wire from a current sensor 118 provided on the output wire for outputting the electric power among the wires connected to the inverter 116. Here, the current IM4 is the total value of current actually flowing through the four main electric motors 104a to 104d. The unit current calculator 117 calculates a current IM_2 actually flowing through each one of the main electric motors 104a to 104d based on the acquired current information. In this embodiment, four main electric motors 104a to 104d are mounted on the variable gauge train 100. Thus, the unit current calculator 117 calculates the current IM_2 by, for example, multiplying the current IM4 indicated in the acquired current information by ¼. The unit current calculator 117 outputs unit current information indicating the current IM_2 obtained by the calculation.

The configuration of the control device 105 of the variable gauge train 100 according to Embodiment 1 of the present disclosure is described above. The operation of the control device 105 of the variable gauge train 100 according to this embodiment is described next.

Figure 3:
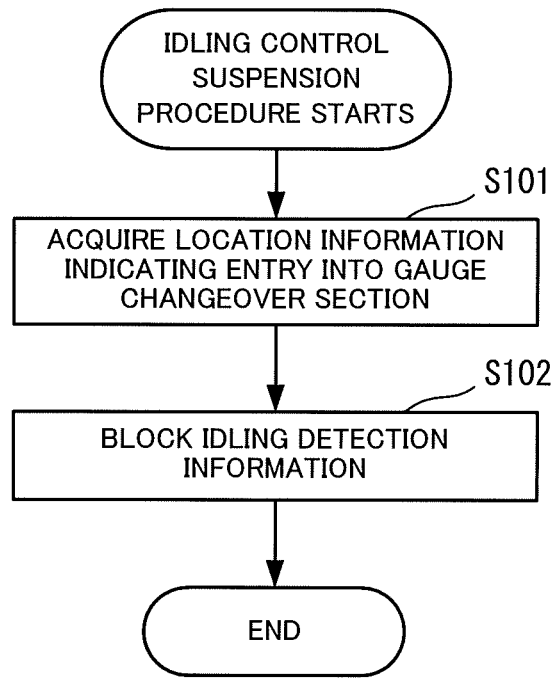
FIG. 3 is a flowchart illustrating a processing flow of an idling control suspension procedure according to Embodiment 1.

The control device 105 executes the idling control suspension procedure illustrated in FIG. 3. The idling control suspension procedure is a procedure to suspend the idling control on the variable gauge train 100 when the variable gauge train 100 enters the gauge changeover section.

The idling control suspension procedure starts when location information indicating entry of the variable gauge train 100 into the gauge changeover section is output from the location detector 109.

As illustrated in the same figure, the idling control switcher 111 acquires location information indicating entry into the gauge changeover section from the location detector 109 (Step S101). The idling control switcher 111 blocks idling detection information output from the idling detector 110 to the torque calculator 112 (Step S102) and ends the idling control suspension procedure. As a result, the idling control by the control device 105 is suspended.

As the above idling control suspension procedure is executed, the torque calculator 112, upon detection by the location detector 109 of entry into the gauge changeover section, suspends the idling control that otherwise restricts the torques of the main electric motors 104a to 104d. As a result, the torque calculator 112 constantly calculates the normal torque pattern regardless of whether the wheels 102a to 102d run idle.

Figure 4:
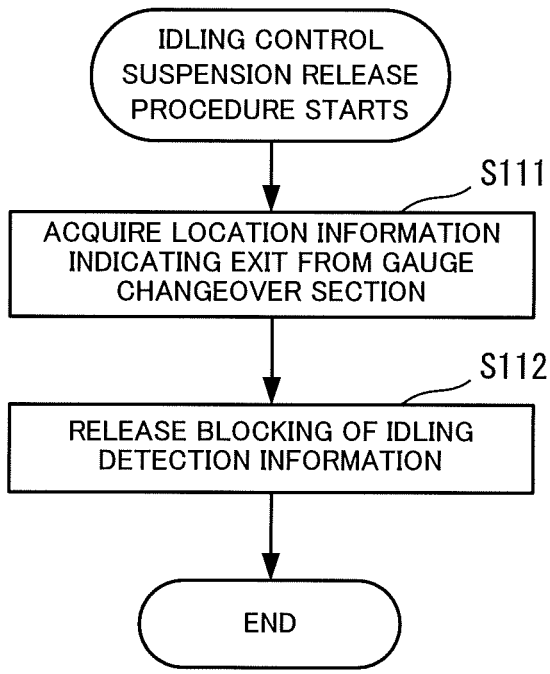
FIG. 4 is a flowchart illustrating a processing flow of an idling control suspension release procedure according to Embodiment 1.

The control device 105 executes the idling control suspension release procedure illustrated in FIG. 4. The idling control suspension release procedure is a procedure to release the suspension of idling control on the variable gauge train 100 when the variable gauge train 100 exits from the gauge changeover section.

The idling control suspension release procedure starts when location information indicating detection of exit of the variable gauge train 100 from the gauge changeover section is output from the location detector 109.

As illustrated in the same figure, the idling control switcher 111 acquires location information indicating exit from the gauge changeover section from the location detector 109 (Step S111). The idling control switcher 111 releases the blocking of idling detection information output from the idling detector 110 to the torque calculator 112 (Step S112) and ends the idling control suspension release procedure.

As a result, the suspension of idling control continued since entry into the gauge changeover section is released. Therefore, the idling detection information output from the idling detector 110 is conveyed to the torque calculator 112 via the idling control switcher 111. As a result, if the wheels 102a to 102d run idle in the regular run section, the idling control on the variable gauge train 100 is executable. Therefore, the idling of the wheels 102a to 102d can be suppressed and force can be mutually transferred on small contact areas between the iron rails and the iron wheels 102a to 102d in the regular run section.

As the above idling control suspension release procedure is executed, the torque calculator 112 executes the idling control to stop idling of the wheels when exit from the gauge changeover section is detected by the location detector 109 and the wheels run idle. As a result, the torque calculator 112 calculates the idling control torque pattern.

Embodiment 1 of the present disclosure is described above.

As the variable gauge train 100 enters the gauge changeover section, for example, in power running at a low speed, the variable gauge train 100 is supported by the car body supports 107 as described above, whereby the car body does not weigh on the wheels of wheels 102a to 102d that are passing through the gauge changeover section.

Here, a case in which two pairs of wheels 102a and 102b are passing through the gauge changeover section is described as an example. In such a case, the car body does not weigh on the wheels 102a and 102b; however, the car body weighs on the wheels 102c and 102d.

The wheels 102a and 102b on which no car body weighs run idle; therefore, the idling detector 110 detects idling of the wheels 102a and 102b and idling detection information indicating idling of the wheels 102a and 102b is output from the idling detector 110. The idling detection information may include non-idling of the wheels 102c and 102d.

Here, unlike this embodiment, the idling control by the control device 105 is assumed to not be suspended while the variable gauge train 100 passes through the gauge changeover section. In such a case, the torque calculator 112 executes the idling control and calculates an idling control torque pattern T. The inverter 116 applies a common alternating-current voltage based on the idling control torque pattern T to the four main electric motors 104a to 104d. Consequently, the torques of all the main electric motors 104a to 104d collectively driven by the inverter 116 are restricted. In other words, the torques of the main electric motors 104c and 104d driving the non-idling wheels 102c and 102d are also restricted. Therefore, the total driving force of the train comprising the variable gauge train 100 might drop significantly.

On the other hand, the control device 105 according to this embodiment suspends the idling control based on the idling detection information when the variable gauge train 100 enters the gauge changeover section. Moreover, the control device 105 releases the suspension of idling control based on the idling detection information when the variable gauge train 100 exits from the gauge changeover section. Thus, the idling control by the control device 105 is suspended in the gauge changeover section.

Therefore, the torque calculator 112 does not execute the idling control even if, for example, the wheels 102a and 102b are running idle in the gauge changeover section and calculates the normal torque pattern T. The inverter 116 applies a common alternating-current voltage based on the normal torque pattern T to the four main electric motors 104a to 104d. Consequently, unlike the case of executing the idling control, the torques of all main electric motors 104a to 104d collectively driven by the inverter 116 are not restricted. In other words, unlike the case of executing the idling control, the torques of the main electric motors 104c and 104d driving the non-idling wheels 102c and 102d are not restricted. As a result, even if the wheels 102a to 102d of the variable gauge train 100 run idle while passing through the gauge changeover section, a drop in the total driving force of the train comprising the variable gauge train 100 can be suppressed.

As described above, according to this embodiment, the main electric motors 104a to 104d driving the non-idling wheels 102a to 102d are not restricted by the idling control even if some of the wheels 102a to 102d enter the gauge changeover section and run idle. Therefore, a drop in the driving force of the entire train comprising the variable gauge train 100 can be suppressed in the gauge changeover section even in a collective control system. Moreover, since the control device 105 of the variable gauge train 100 can employ a collective control system, the control device 105 of the variable gauge train 100 with a reduced size, weight, and cost compared to that of a control device employing an individual control system can be provided.

Embodiment 2

The wheels 102a to 102d run idle in the gauge changeover section as described above. The rotation numbers of the main electric motors 104a to 104d for driving the idling wheels 102a to 102d approaches, without limitation, synchronous speed. Therefore, the current flowing through the main electric motors 104a to 104d for driving the idling wheels 102a to 102d significantly decreases. Consequently, the current IM4 measured by the current sensor 118 decreases.

The voltage command calculator 115 according to Embodiment 1 executes the current feedback control even while the idling control is suspended in the gauge changeover section. Since the IM4 decreases as mentioned above, the current IM_2 actually flowing through each one of the main electric motors 104a to 104d decreases and consequently, the correction amount ΔIM increases. In Embodiment 1, the correction amount ΔIM is added to obtain the final voltage E (namely, the post-current-feedback-control E), whereby the IM4 increases as the correction amount ΔIM is increases. The current corresponding to the increase in the IM4 all gathers at the main electric motors 104a to 104d for driving the non-idling wheels 102a to 102d. As just mentioned, a large current may possibly flow through the main electric motors 104a to 104d for driving the non-idling wheels 102a to 102d as a result of the current feedback control. When a large current flows through the main electric motors 104a to 104d, this may cause a problem such as overheating, damage or failure in the main electric motors 104a to 104d.

In order to prevent the above matter, in this embodiment, the current feedback control is suspended in the gauge changeover section in addition to suspension of the idling control as in Embodiment 1.

Figure 5:
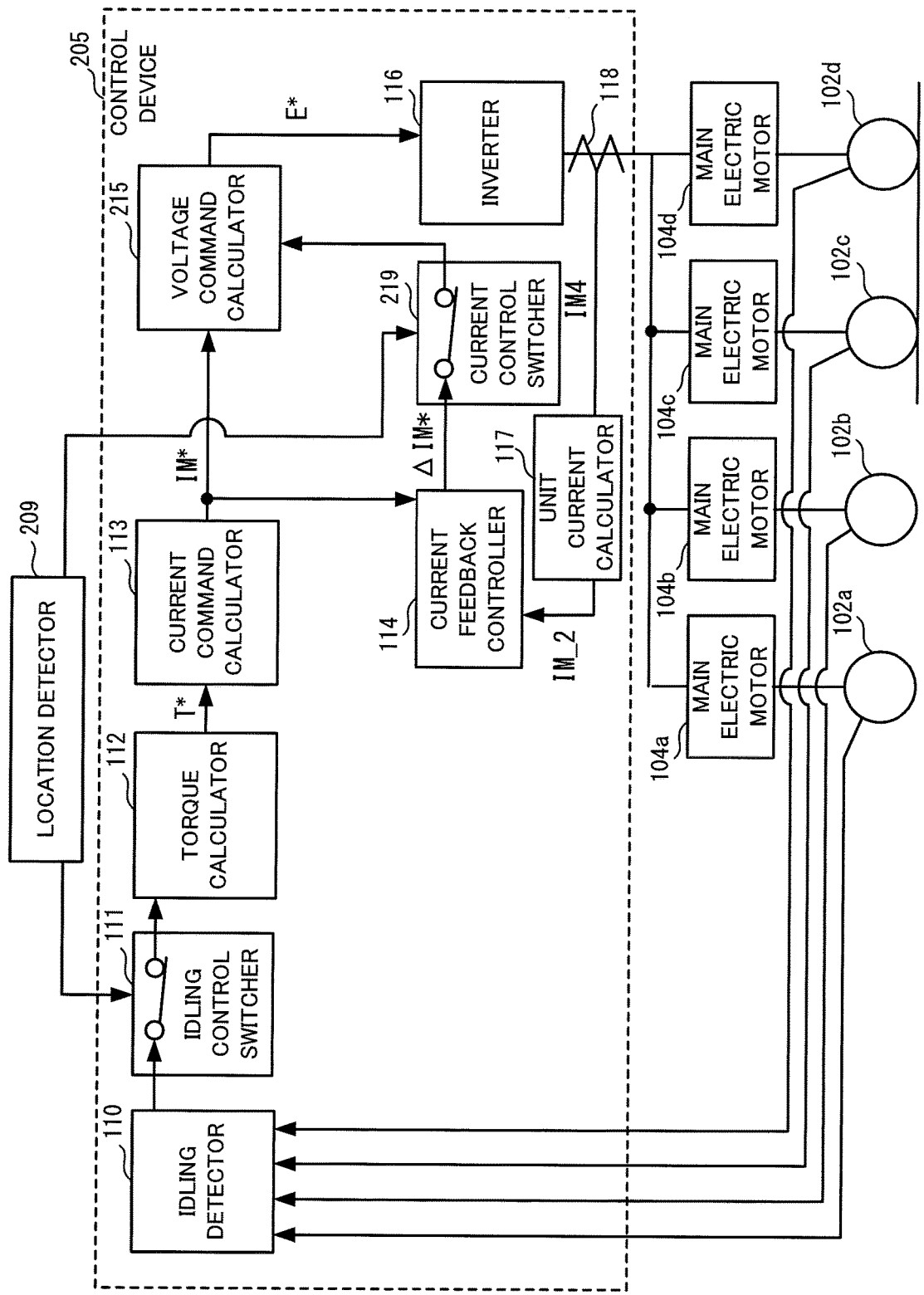
FIG. 5 is a diagram illustrating a configuration of a control device according to Embodiment 2 of the present disclosure.

A control device 205 according to this embodiment comprises, as illustrated in FIG. 5, a location detector 209 and a voltage command calculator 215 in place of the location detector 109 and voltage command calculator 115 provided to the control device 105 according to Embodiment 1. Moreover, the control device 205 further comprises a current control switcher 219 for switching between execution and suspension of idling control (described in detail below) based on the detection result of the idling detector 110. Except for those components, the control device 205 has the same configuration as the control device 105 according to Embodiment 1.

The location detector 209 detects whether the variable gauge train 100 is in the gauge changeover section as the location detector 109 does according to Embodiment 1. The location detector 209 outputs location information indicating the detection result to the current control switcher 219 in addition to output to the idling control switcher 111 as the location detector 109 does according to Embodiment 1.

The current control switcher 219 acquires the location information output from the location detector 209. The current control switcher 219 switches, based on the acquired location information, whether to output to the voltage command calculator 215 a current feedback control command ΔIM* output from the current feedback controller 114.

In detail, the current control switcher 219 does not output to the voltage command calculator 215 a current feedback control command ΔIM* from the current feedback controller 114 when location information indicating entry into the gauge changeover section is acquired. In other words, in this case, the current control switcher 219 blocks the current feedback control command ΔIM* output from the current feedback controller 114 to the voltage command calculator 215 and thus suspends the current feedback control.

The current control switcher 219 outputs to the voltage command calculator 215 a current feedback control command ΔIM* from the current feedback controller 114 when location information indicating exit from the gauge changeover section is acquired. In other words, in such a case, the current control switcher 219 releases the blocking of the current feedback control command ΔIM* output from the current feedback controller 114 to the voltage command calculator 215 and thus releases the suspension of current feedback control.

When no current feedback control command ΔIM* is acquired, the voltage command calculator 215 suspends the current feedback control and outputs a voltage command E* including a pre-current-feedback-control voltage (the first voltage) E. That no current feedback control command ΔIM* is acquired means that the variable gauge train 100 is running in the gauge changeover section and therefore the current control switcher 219 blocks the current feedback control command ΔIM*.

When a current feedback control command ΔIM* is acquired, the voltage command calculator 215 executes the current feedback control as in Embodiment 1 and outputs a voltage command E* including a post-current-feedback-control voltage (the second voltage) E. That a current feedback control command ΔIM* is acquired means that the variable gauge train 100 is running in the regular run section and therefore the current control switcher 219 does not block the current feedback control command ΔIM*.

The configuration of the control device 205 of the variable gauge train 100 according to Embodiment 2 of the present disclosure is described above. The operation of the control device 205 of the variable gauge train 100 according to this embodiment is described next.

The control device 205 executes the same idling control suspension procedure and idling control suspension release procedure as in Embodiment 1. Additionally, the control device 205 executes the current feedback control suspension procedure and current feedback control suspension release procedure illustrated in FIGS. 6 and 7, respectively.

Figure 6:
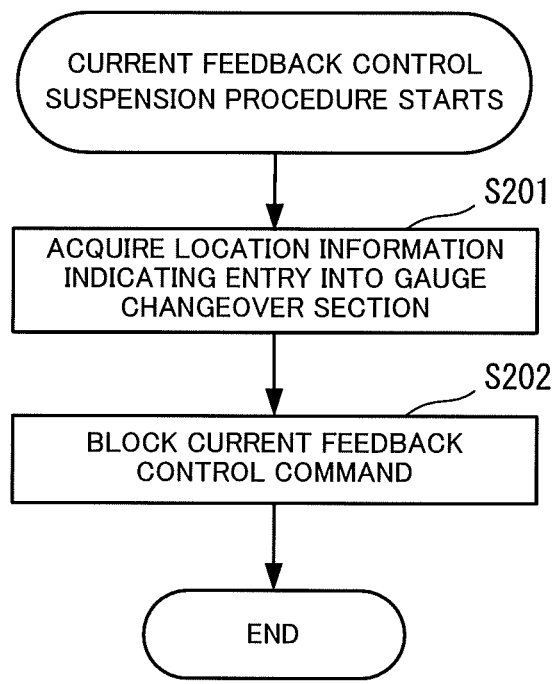
FIG. 6 is a flowchart illustrating a processing flow of a current feedback control suspension procedure according to Embodiment 2.

The control device 205 executes the current feedback control suspension procedure illustrated in FIG. 6. The current feedback control suspension procedure is a procedure to suspend the current feedback control on the variable gauge train 100 when the variable gauge train 100 enters the gauge changeover section.

The current feedback control suspension procedure starts when location information indicating entry of the variable gauge train 100 into the gauge changeover section is output from the location detector 209.

As illustrated in the same figure, the current control switcher 219 acquires location information indicating entry into the gauge changeover section from the location detector 209 (Step S201). The current control switcher 219 blocks the current feedback control command ΔIM* output from the current feedback controller 114 to the voltage command calculator 215 (Step S202) and ends the current feedback control suspension procedure. As a result, the current feedback control by the control device 205 is suspended.

As the above current feedback control suspension procedure is executed, the voltage command calculator 215 suspends the current feedback control when entry into the gauge changeover section is detected by the location detector 209. As a result, the voltage command calculator 215 outputs a voltage command E* including a pre-current-feedback-control voltage E.

Figure 7:
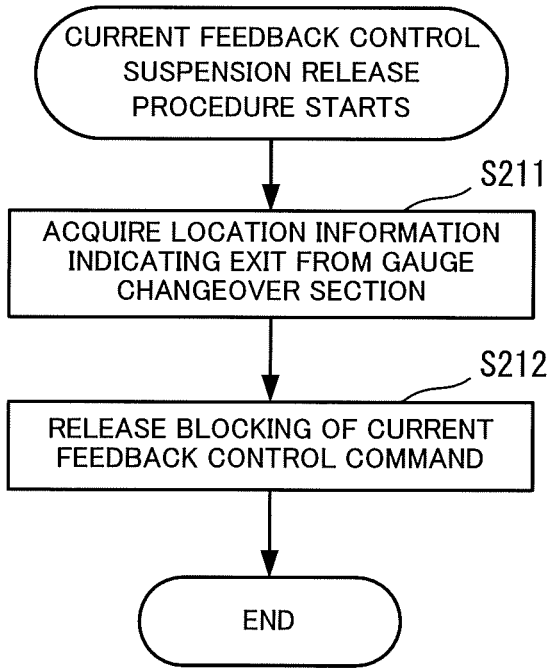
FIG. 7 is a flowchart illustrating a processing flow of a current feedback control suspension release procedure according to Embodiment 2.

The control device 205 executes the current feedback control suspension release procedure illustrated in FIG. 7. The current feedback control suspension release procedure is a procedure to release the suspension of current feedback control on the variable gauge train 100 when the variable gauge train 100 exits from the gauge changeover section.

The current feedback control suspension release procedure starts when location information indicating detection of exit of the variable gauge train 100 from the gauge changeover section is output from the location detector 209.

As illustrated in the same figure, the current control switcher 219 acquires location information indicating exit from the gauge changeover section from the location detector 209 (Step S211). The current control switcher 219 releases the blocking of the current feedback control command ΔIM* output from the current feedback controller 114 to the voltage command calculator 215 (Step S212) and ends the current feedback control suspension release procedure.

As a result, the suspension of current feedback control continued since entry into the gauge changeover section is released. Therefore, the current feedback control command ΔIM* output from the current feedback controller 114 is conveyed to the voltage command calculator 215 via the current control switcher 219. As a result, the current feedback control on the variable gauge train 100 can be executed in the regular run section.

As the above current feedback control suspension release procedure is executed, the voltage command calculator 215 executes the current feedback control when exit from the gauge changeover section is detected by the location detector 209. As a result, the voltage command calculator 215 outputs a voltage command E* including a post-current-feedback-control voltage E.

Embodiment 2 of the present disclosure is described above.

This embodiment yields the same efficacy as Embodiment 1.

Additionally, in this embodiment, the control device 205 suspends the current feedback control in the gauge changeover section. As a result, even if the idling control is suspended in the gauge changeover section, it is possible to suppress occurrence of overheat, damage, failure, and the like of the main electric motors 104a to 104d for driving the non-idling wheels 102a to 102d as described below using a case.

For example, it is assumed that two pairs of wheels 102a and 102b are passing through the gauge changeover section and are therefore running idle. On the other hand, it is assumed that the wheels 102c and 102d are in the regular run section and not running idle. The idling detector 110 outputs idling detection information indicating idling of the wheels 102a and 102b. The idling detection information may present non-idling of the wheels 102c and 102d where appropriate.

In such a case, the main electric motors 104a and 104b for driving the wheels 102a and 102b rotate nearly at the synchronous speed and the slip frequency is nearly zero. Therefore, the current flowing through the main electric motors 104a and 104b each significantly decrease. As a result, the IM4 flowing through the output wire of the inverter 116 is diminished.

Here, as in Embodiment 1, the idling control by the control device 105 is assumed to be suspended and the current feedback control is assumed to not be suspended while the variable gauge train 100 passes through the gauge changeover section. In such a case, the current feedback controller 114 assumes that a current flows through the main electric motors 104a and 104b and increases the correction amount ΔIM to make the current IM_1 and the current IM_2 match. Then, the voltage command calculator 115 outputs a voltage command E* to increase the alternating-current voltage from the inverter 116 in accordance with the increase in the correction amount ΔIM. Consequently, a large current may intensively flow through the main electric motors 104c and 104d for driving the non-idling wheels 102c and 102d. As a result, the main electric motors 104c and 104d have the risk of becoming in an overcurrent state and undergoing overheat, damage, failure, and the like.

In this embodiment, the idling control by the control device 205 is suspended and the current feedback control is suspended while the variable gauge train 100 passes through the gauge changeover section. Therefore, even if the current feedback controller 114 increases the correction amount ΔIM while the variable gauge train 100 passes through the gauge changeover section, the control with reference to that correction amount ΔIM is not executed. In other words, the voltage command calculator 215 does not increase the alternating-current voltage from the inverter 116 in accordance with the increase in the correction amount ΔIM.

As described above, according to this embodiment, even if the idling control by the control device 205 is suspended, large current can be suppressed from flowing through the main electric motors 104c and 104d for driving the non-idling wheels 102c and 102d as in the case of executing the current feedback control.

Hence, even if the idling control is suspended in the gauge changeover section, any occurrence of overheat, damage, failure, and the like of the main electric motors 104c and 104d for driving the non-idling wheels 102c and 102d can be prevented.

In Embodiment 2, a case in which the idling control and the current feedback control are suspended in the gauge changeover section is described.

When the control device 205 does not have the function of idling control, it is useful to suspend only the current feedback control in the gauge changeover section. As a result, large current can be suppressed from flowing through the main electric motors for driving the non-idling wheels in the gauge changeover section.

Embodiment 3

In Embodiment 2, when the idling control is suspended, the current feedback control is suspended for suppressing overheat and the like of the main electric motors 104a to 104d for driving the non-idling wheels 102a to 102d due to a large current flowing through the main electric motors 104a to 104d. In this embodiment, a current feedback control target value corresponding to the number of main electric motors 104a to 104d for driving the non-idling wheels 102a to 102d is set.

Figure 8:
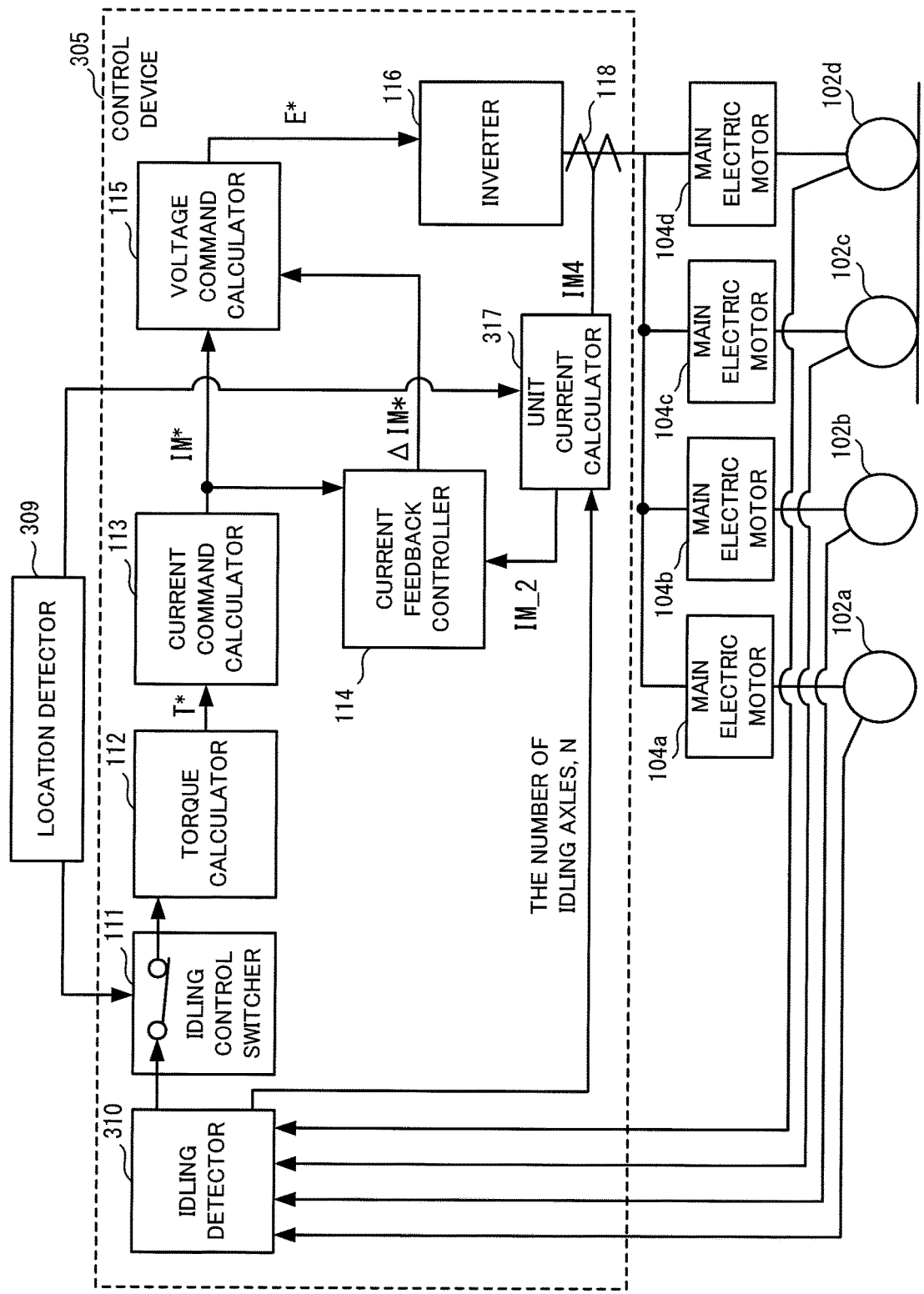
FIG. 8 is a diagram illustrating a configuration of a control device according to Embodiment 3 of the present disclosure.

A control device 305 according to this embodiment comprises, as illustrated in FIG. 8, a location detector 309, an idling detector 310, and a unit current calculator 317 in place of the location detector 109, idling detector 110, and unit current calculator 117 provided to the control device 105 according to Embodiment 1. Except for those components, the control device 305 has the same configuration as the control device 105 according to Embodiment 1.

The location detector 309 detects whether the variable gauge train 100 is in the gauge changeover section as the location detector 109 does according to Embodiment 1. The location detector 309 outputs location information indicating the detection result to the unit current calculator 317 in addition to output to the idling control switcher 111 as the location detector 109 does according to Embodiment 1.

The idling detector 310 detects idling of each of the wheels 102a to 102d as the idling detector 110 does according to Embodiment 1. The idling detector 310 outputs idling detection information indicating the detection result to the torque calculator 112 via the idling control switcher 111 blocking the idling detection information and releasing the blocking as the idling detector 110 does according to Embodiment 1. Additionally, the idling detector 310 outputs to the unit current calculator 317 idling detection information including the number of axles 103a to 103d corresponding to the wheels 102a to 102d running idle as a result of the detection (the number of idling axles, N).

The unit current calculator 317 acquires current information indicating the current IM4 (a current value) flowing through the output wire from the current sensor 118 provided on the output wire for outputting the electric power among the wires connected to the inverter 116 as the unit current calculator 117 does according to Embodiment 1.

Unlike the unit current calculator 117 according to Embodiment 1, the unit current calculator 317 calculates the current IM_2 actually flowing through each one of the main electric motors 104a to 104d for driving the non-idling wheels 102a to 102d based on the acquired current information from detection by the location detector 309 of entry of the variable gauge train 100 into the gauge changeover section to detection of exit from the gauge changeover section, in other words while the variable gauge train 100 passes through the gauge changeover section. For example, when the wheels 102a and 102b are running idle in the gauge changeover section, the number of idling axles, N, is 2. In such a case, since four main electric motors 104a to 104d are mounted on the variable gauge train 100 and the main electric motors 104a to 104d have one-to-one correspondence to the axles 103a to 103d in this embodiment, the number of main electric motors 104a to 104d for driving the non-idling wheels 102a to 102d, namely the number of non-idling axles, (4−N), is 2. Here, the number of non-idling axles is the number of axles 103a to 103d corresponding to the non-idling wheels 102a to 102d. The unit current calculator 317 calculates the current IM_2 by, for example, multiplying the current IM4 indicated in the acquired current information by ½ (=1/(4−N)).

The unit current calculator 317 outputs to the current feedback controller 114 unit current information indicating the current IM_2 obtained by the calculation as the unit current calculator 117 does according to Embodiment 1.

In the regular run section, the unit current calculator 317 operates as the unit current calculator 117 does according to Embodiment 1.

Here, in this embodiment, the post-current-feedback-control voltage E calculated upon entry into the gauge changeover section corresponds to the third voltage. Moreover, in this embodiment, the post-current-feedback-control voltage E calculated when exit from the gauge changeover section is detected by the location detector 309 is the same post-current-feedback-control voltage E as in Embodiment 1 and corresponds to the second voltage.

The configuration of the control device 305 of the variable gauge train 100 according to Embodiment 3 of the present disclosure is described above. The operation of the control device 305 of the variable gauge train 100 according to this embodiment is described next.

The control device 305 executes the same idling control suspension procedure and idling control suspension release procedure as in Embodiment 1. Additionally, the control device 305 executes the current feedback control change procedure and current feedback control change cancellation procedure illustrated in FIGS. 9 and 10, respectively.

Figure 9:
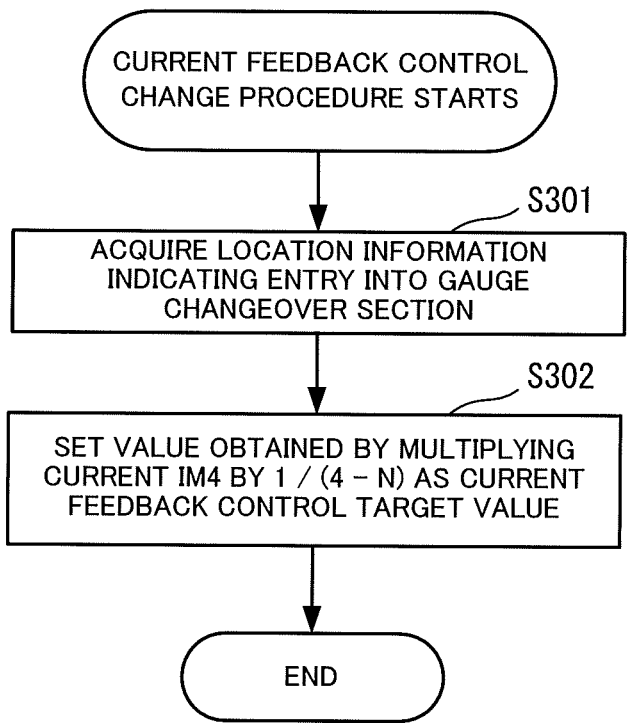
FIG. 9 is a flowchart illustrating a processing flow of a current feedback control change procedure according to Embodiment 3.

The control device 305 executes the current feedback control change procedure illustrated in FIG. 9. The current feedback control change procedure is a procedure to make a setting for executing the current feedback control corresponding to the number of main electric motors 104a to 104d for driving the non-idling wheels 102a to 102d when the variable gauge train 100 enters the gauge changeover section.

The current feedback control change procedure starts when location information indicating entry of the variable gauge train 100 into the gauge changeover section is output from the location detector 309.

As illustrated in the same figure, the unit current calculator 317 acquires location information indicating entry into the gauge changeover section from the location detector 309 (Step S301). The unit current calculator 317 sets a value obtained by multiplying the current IM4 indicated in current information acquired from the current sensor 118 by 1/(4−N) as the current feedback control target value (Step S302). Here, the denominator "4−N" of the multiplier 1/(4−N) to multiply the current IM4 is the number of main electric motors 104a to 104d for driving the non-idling wheels 102a to 102d and equal to the number of non-idling axles in this embodiment. Then, the unit current calculator 317 ends the current feedback control change procedure.

As the current feedback control change procedure is executed, the current feedback control using as the target value the value corresponding to the number of main electric motors 104a to 104d for driving the non-idling wheels 102a to 102d can be executed.

Figure 10:
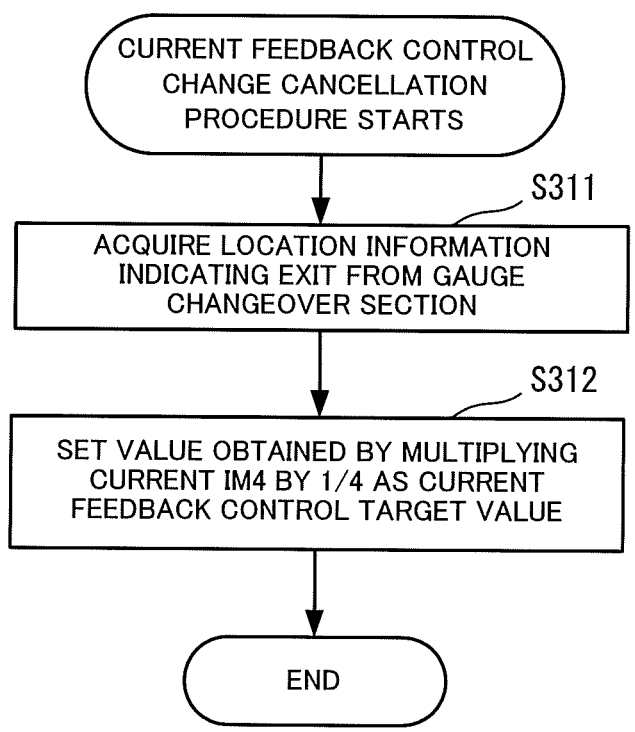
FIG. 10 is a flowchart illustrating a processing flow of a current feedback control change cancellation procedure according to Embodiment 3.

The control device 305 executes the current feedback control change cancellation procedure illustrated in FIG. 10. The current feedback control change cancellation procedure is a procedure to make a setting for executing the current feedback control corresponding to the total number of main electric motors 104a to 104d when the variable gauge train 100 exits from the gauge changeover section.

The current feedback control change cancellation procedure starts when location information indicating detection of exit of the variable gauge train 100 from the gauge changeover section is output from the location detector 309.

As illustrated in the same figure, the unit current calculator 317 acquires location information indicating exit from the gauge changeover section from the location detector 309 (Step S311). The unit current calculator 317 sets, as the current feedback control value, a value obtained by multiplying the current IM4 indicated in current information acquired from the current sensor 118 by ¼ (Step S312). Here, the denominator, 4, of the fraction, ¼, which the current IM4 is multiplied by, represents the total number of main electric motors 104a to 104d in this embodiment. Then, the unit current calculator 317 ends the current feedback control change cancellation procedure.

As the current feedback control change cancellation procedure is executed, the setting changed upon entry into the gauge changeover section is cancelled and the current feedback control using as the target value the value corresponding to the total number of main electric motors 104a to 104d can be executed.

Embodiment 3 of the present disclosure is described above.

This embodiment yields the same efficacy as Embodiment 1.

Additionally, in this embodiment, the control device 305 sets the current feedback control target value in accordance with the number of main electric motors 104a to 104d for driving the non-idling wheels 102a to 102d (namely, the number of non-idling axles, 4−N) in the gauge changeover section. Therefore, even if the idling control is suspended in the gauge changeover section, the correction amount ΔIM is unlikely to be increased to the extent that an overcurrent flows through the main electric motors 104a to 104d for driving the non-idling wheels 102a to 102d. Therefore, even if the idling control is suspended and the current feedback control is executed in the gauge changeover section, it is possible to suppress occurrence of overheat, damage, failure, and the like of the main electric motors 104a to 104d for driving the non-idling wheels 102a to 102d.

Although embodiments and modified examples of the present disclosure are described above, the embodiments and modified examples described above do not limit the scope of the present disclosure. The present disclosure includes suitable combinations of the embodiments and the modified examples, including appropriate further modifications.

INDUSTRIAL APPLICABILITY

The variable gauge train control device according to the present disclosure is useful for variable gauge train control devices employing the collective control system.

REFERENCE SIGNS LIST

100 Variable gauge train
102a to 102d Wheel
103a to 103d Axle
104a to 104d Main electric motor
105, 205, 305 Control device
109, 209, 309 Location detector
110, 310 Idling detector
111 Idling control switcher
112 Torque calculator
113 Current command calculator
114 Current feedback controller
115, 215, 315 Voltage command calculator
116 Inverter
117, 317 Unit current calculator
118 Current sensor
219 Current control switcher

The invention claimed is:
1. A variable gauge train control device, comprising:
an inverter to collectively control torques of main electric motors;
a location detector to detect an entry into a gauge changeover section;
an idling detector to detect idling of wheels and output idling detection information;
a torque calculator to calculate a first torque pattern for making the inverter operate and, when the idling detection information indicating idling of wheels is input from the idling detector, calculate a second torque pattern for making the inverter operate with more restricted torques of the main electric motors than the first torque pattern; and
an idling control switcher to, upon detection by the location detector of the entry into the gauge changeover section, block the idling detection information output from the idling detector to the torque calculator.

2. The variable gauge train control device according to claim 1, wherein
the location detector further detects an exit from the gauge changeover section, and
the idling control switcher further, upon detection by the location detector of the exit from the gauge changeover section, releases the blocking of the idling detection information output from the idling detector to the torque calculator.

3. The variable gauge train control device according to claim 1, further comprising:
a current command calculator to calculate a current to flow through a unit number of the main electric motors based on the first torque pattern calculated by the torque calculator; and
a voltage command calculator to, upon detection by the location detector of the entry into the gauge changeover section, suspend current feedback control that is otherwise based on the current calculated by the current command calculator and a current actually flowing through the main electric motors, and calculate a first voltage for the inverter to collectively output to the main electric motors based on the current calculated by the current command calculator.

4. The variable gauge train control device according to claim 3, wherein
the location detector further detects an exit from the gauge changeover section, and
the voltage command calculator further, upon detection by the location detector of the exit from the gauge changeover section, executes the current feedback control and calculates a second voltage for the inverter to collectively output to the main electric motors.

5. The variable gauge train control device according to claim 1, further comprising:
a current command calculator to calculate a current to flow through a unit number of the main electric motors based on the first torque pattern calculated by the torque calculator; and
a voltage command calculator to, upon detection by the location detector of the entry into the gauge changeover section, calculate a third voltage for the inverter to collectively output to the main electric motors based on a result detected by the idling detector and the current calculated by the current command calculator so that a current corresponding to a number of the main electric motors driving non-idling wheels flows from the inverter.

6. The variable gauge train control device according to claim 5, wherein
the location detector further detects an exit from the gauge changeover section, and
the voltage command calculator further calculates, upon detection by the location detector of the exit from the gauge changeover section, a second voltage for the inverter to collectively output to the main electric motors based on the current calculated by the current command calculator so that a current corresponding to a total number of the main electric motors flows from the inverter.

7. A variable gauge train control device, further comprising:
an inverter to collectively control torques of main electric motors;
a location detector to detect an entry into a gauge changeover section;
a torque calculator to calculate a first torque pattern for making the inverter operate;
a current command calculator to calculate and output a current value to flow through a unit number of the main electric motors based on the first torque pattern calculated by the torque calculator;
a current feedback controller to output a current feedback control command including a correction amount to make the current value input from the current command calculator and a current value actually flowing through the unit number of the main electric motors match;
a voltage command calculator to, calculate a first voltage value for the inverter to collectively output to the main electric motors based on the current value input from the current command calculator and, when the current feedback control command is input from the current feedback controller, calculate a second voltage value added the correction amount included in the current feedback control command to the first voltage value; and
a current control switcher to, upon detection by the location detector of the entry into the gauge changeover section, block the current feedback control command output from the current feedback controller to the voltage command calculator.

8. The variable gauge train control device according to claim 7, wherein
the location detector further detects an exit from the gauge changeover section, and
the current control switcher further, upon detection by the location detector of the exit from the gauge changeover section, releases the blocking of the current feedback control command output from the current feedback controller to the voltage command calculator.

9. A variable gauge train control device, comprising:
an inverter to collectively control torques of main electric motors;
a location detector to detect an entry into a gauge changeover section;
a torque calculator to, upon detection by the location detector of the entry into the gauge changeover section, suspend idling control that otherwise restricts the torques of the main electric motors, and calculate a first torque pattern for making the inverter operate in accordance with the torques of the main electric motors;
an idling detector to detect idling of each wheel;
a current command calculator to calculate a current to flow through a unit number of the main electric motors based on the first torque pattern calculated by the torque calculator; and
a voltage command calculator to, upon detection by the location detector of the entry into the gauge changeover section, calculate a third voltage for the inverter to collectively output to the main electric motors based on a result detected by the idling detector and the current calculated by the current command calculator so that a current corresponding to a number of the main electric motors driving non-idling wheels flows from the inverter.

10. The variable gauge train control device according to claim 9, wherein
the location detector further detects an exit from the gauge changeover section, and
the voltage command calculator further calculates, upon detection by the location detector of the exit from the gauge changeover section, a second voltage for the inverter to collectively output to the main electric motors based on the current calculated by the current command calculator so that a current corresponding to a total number of the main electric motors flows from the inverter.

\* \* \* \* \*